United States Patent [19]
Satomi

[11] 4,040,733
[45] Aug. 9, 1977

[54] VARIABLE MAGNIFICATION SLITWISE EXPOSURE PROCESS AND APPARATUS THEREFOR FOR USE WITH ELECTROPHOTOGRAPHIC COPYING MACHINE

[75] Inventor: Toyokazu Satomi, Yokohama, Japan

[73] Assignee: Ricoh Company, Ltd., Japan

[21] Appl. No.: 643,794

[22] Filed: Dec. 23, 1975

[30] Foreign Application Priority Data

Dec. 25, 1974 Japan .................................. 50-3815

[51] Int. Cl.² ...................... G03B 27/48; G03B 27/50; G03B 27/70; G03B 27/32
[52] U.S. Cl. ......................................... 355/8; 355/51; 355/66; 355/77
[58] Field of Search ................... 355/8, 57, 51, 55, 65, 355/66, 77, 11

[56] References Cited

U.S. PATENT DOCUMENTS

| | | | |
|---|---|---|---|
| 3,438,704 | 4/1969 | Schoen | 355/8 |
| 3,572,924 | 3/1971 | Matsumoto et al. | 355/66 X |
| 3,614,222 | 10/1971 | Post et al. | 355/8 |
| 3,703,334 | 11/1972 | Knechtel et al. | 355/66 X |
| 3,711,199 | 1/1973 | Koizumi | 355/57 |
| 3,743,414 | 7/1973 | Kirchhoff | 355/66 X |
| 3,829,209 | 8/1974 | Buddendeck et al. | 355/66 X |
| 3,841,753 | 10/1974 | Ogawa | 355/8 |
| 3,858,976 | 1/1975 | Brooke | 355/66 |
| 3,914,044 | 10/1975 | Ogawa | 355/8 |
| 3,917,393 | 11/1975 | Nier | 355/8 X |

*Primary Examiner*—Donald A. Griffin
*Attorney, Agent, or Firm*—McGlew and Tuttle

[57] ABSTRACT

The exposure process and apparatus are for use with electrophotographic copying machines of the type in which a photosensitive surface is moved at a constant rate at any magnification selected. Upon changing from a magnification of unity to a magnification of $\beta$, a lens means arrangement which may be of any type, e.g., a customary lens, a variable focus lens, a lens of in-prism or in-mirror construction, is displaced, in a direction perpendicular to the optical axis thereof at unity magnification, by a distance which is determined in accordance with $\beta$ and another factor so that the same position for placement of an original to be copied on a holder such as a glass plate, can be maintained as the magnification is varied.

16 Claims, 8 Drawing Figures

VARIABLE MAGNIFICATION SLITWISE EXPOSURE PROCESS AND APPARATUS THEREFOR FOR USE WITH ELECTROPHOTOGRAPHIC COPYING MACHINE

BACKGROUND OF THE INVENTION

The invention relates to a variable magnification slitwise exposure process and an exposure system therefor which may be used in electrophotographic copying machines.

It would be convenient if a single electrophotographic copying machine could be utilized to provide a copied image of varying magnifications selectively while using an original of a given size. To this end, a variety of exposure techniques have been proposed to provide a variable magnification.

Referring to FIG. 1, there is shown one example of an optical exposure system, for carrying out a variable magnification slitwise exposure process, which has been heretofore proposed. The system comprises a lens L and a reflecting mirror system 2 to form an optical path between an original O and a photosensitive member 1 so as to focus a real image of the original onto the surface of the photosensitive member 1 through the lens L. Section I of FIG. 1 represents the arrangement of the reflecting mirror system 2 and the lens L for a magnification of unity. At this time, the original is moved in the direction indicated by an arrow at a rate of $V_O$. A portion of the original which passes through a point $P_O$ is focussed onto the surface of the photosensitive member 1 which passes through a point $q_0$ which represents a fixed point in space of the system. It will be understood that the original must be placed in a manner such that its leading edge, as viewed in the direction of its movement, is located at the point $p_O$ at the commencement of a copying operation.

If a copy image of a different magnification is desired, the reflecting mirror system 2 and the lens L must be transposed to different positions and the rate of movement of the original changed from $V_0$ to $V_1$ depending on the new magnification, as illustrated in Section II of FIG. 1. This changes the length of the optical path from the original to the photosensitive member 1, so that, if the focussing point $q_0$ is to be maintained stationary, the leading end of the original must be transposed to a different point $p_1$ at the commencement of a copying operation. Thus, the position in which the original is placed must be changed depending on the magnitude of the magnification desired, which is inconvenient for practical purposes.

While it is possible to maintain the same position of the original and the same rate of movement of the original when the magnification is varied while employing an optical exposure system as illustrated, it is then necessary to change the position and the rate of rotation of the photosensitive member 1 in accordance with the magnitude of the magnification, which results in a complex construction of the copying machine. In addition, since the rotation of the photosensitive member 1 governs the entire copying process, the timing of operating various units associated with the charging, exposure and developing steps will have to be changed as the rate of rotation of the photosensitive member is changed in accordance with the magnification, resulting in a further inconvenience. Such a difficulty can be avoided in a so-called flash exposure system in which both the original and the photosensitive member remain stationary. However, this technique involves an increase in the overall size even for a magnification of unity. If such system is constructed for a variable magnification, the exposure area of the photosensitive member must be increased by a factor corresponding to the magnification which is intended to be employed during the copying process, thus further increasing the overall size of the system.

SUMMARY OF THE INVENTION

It is an object of the invention to provide a variable magnification slitwise exposure process and a system for carrying out the same which enables an electrophotographic copying machine to be used to provide a copy image of a variable magnification, without requiring a change either in the position of an original or in the position and movement of a photosensitive member which is exposed to radiation from the original.

DETAILED DESCRIPTION OF EMBODIMENT

A feature of the invention resides in the use of a lens of an in-prism or in-mirror construction, such as a conventional in-prism lens, in-mirror lens, or an in-prism or in-mirror lens of a variable focus, for partly compensating for a change in the length of the optical path, which occurs with a change in the magnification, through a displacement of the lens.

For the convenience of description, a through lens which is equivalent to a lens of an in-prism or in-mirror construction will be considered, applying the formula applicable to a thin lens.

Figure 1:
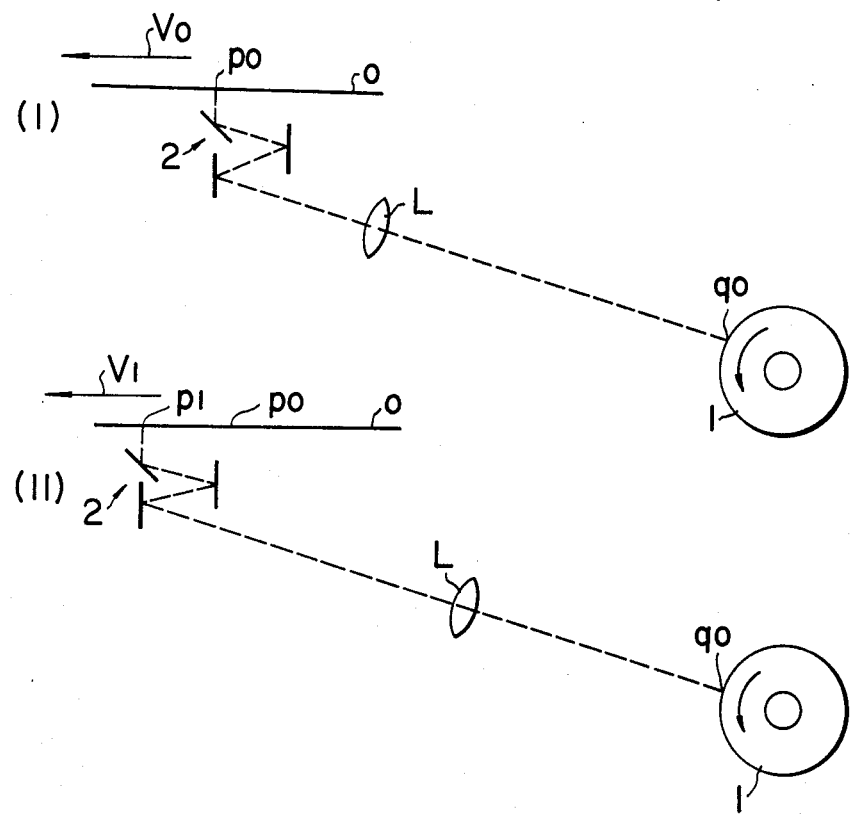
FIG. 1 is a diagrammatic view of a conventional system for carrying out a variable magnification slitwise exposure process.
Figure 2:
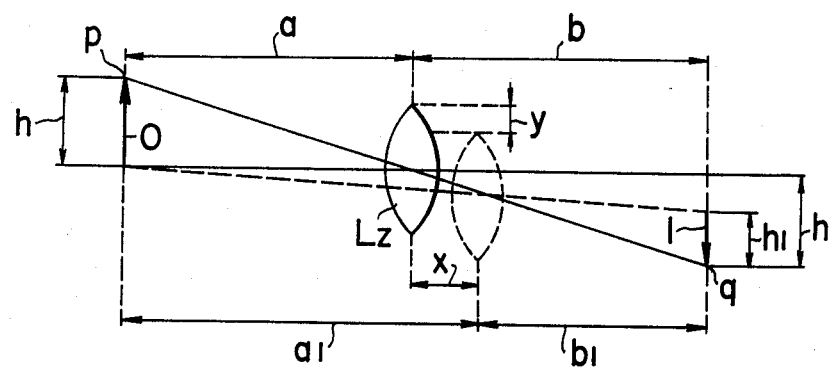
FIGS. 2 and 3 are diagrammatic views illustrating the principle of the invention, specifically showing a displacement of the lens.

Referring to FIG. 2, there is shown a variable focus lens Lz. An object is shown at O, while an image of the object O, formed by the variable focus lens Lz, is shown at I. For a height $h$ of the object O, the height of the image is designated by $h_1$ for magnifications other than unity, it being understood that the height of the image will be equal to $h$ for a magnification of unity. It is assumed that the lens Lz has a focal length of $f_0$ at a magnification of unity and $f_1$ at a varied magnification. The distance between the object O and the lens Lz is designated by $a$ at a magnification of unity and by $a_1$ at a varied magnification, while the distance between the image I and the lens Lz is designated by $b$ at a magnification of unity and by $b_1$ at a varied magnification, which is assumed to be $\beta$. Since $2f_0 = a = b$ and $b_1 = \beta a_1$, the following relationship is obtained for a distance x through which the variable focus lens Lz must be moved parallel to the optical axis when changing from a magnification of unity to a magnification of $\beta$:

$$\frac{b_1}{a_1} = \frac{a-x}{a+x} = \beta \tag{1}$$

or $$x = \frac{1-\beta}{1+\beta} a = \frac{1-\beta}{1+\beta} \cdot 2f_O \tag{2}$$

At this time, the focal length $f_1$ of the lens $Lz$ is given by the following equation:

$$f_1 = \frac{4f_O \beta}{(1+\beta)^2} \tag{3}$$

In order to maintain the same position for placement of the original as the magnification is varied, it is necessary that a fixed point, for example, point $p$, on the object O be always focussed onto the point $q$ in the image field regardless of the magnification. This means that the lens $Lz$ must be displaced along a line joining the points $p$ and $q$ when the magnification is changed. Representing a displacement required for the lens $Lz$ to be displaced in a direction perpendicular to the optical axis by $y$, the following relationship prevails:

$$a : h = x : y \tag{4}$$

or $$y = \frac{h}{a} x = \frac{h}{2f_O} \cdot \frac{1-\beta}{1+\beta} \cdot 2f_O = \frac{1-\beta}{1+\beta} h \tag{5}$$

Figure 3:
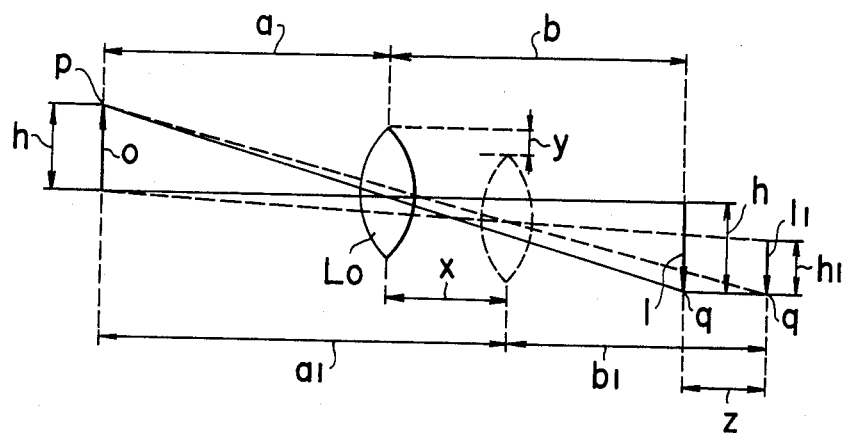

Considering a customary lens, FIG. 3 shows that the object O is focussed by a customary lens $L_O$ having a focal length of $f$ to form an image at I and I₁, respectively, at a magnification of unity and $\beta$, respectively. The image field undergoes a displacement $z$ as the magnification is varied. To avoid confusion, reference characters appearing in FIG. 2 are also used in FIG. 3 wherever applicable. In the arrangement shown in FIG. 3, the lens $L_O$ will have to be displaced by an amount $x$ in a direction parallel to the optical axis when the magnification is changed from unity to $\beta$. Since $b_1 = a_1\beta$, $a_1 = a + x$, the displacement $x$ can be determined by the following equation:

$$\frac{1}{a+x} + \frac{1}{\beta(x+a)} = \frac{1}{f} \tag{6}$$

or $$x = \frac{1-\beta}{\beta} \cdot f \tag{7}$$

The displacement $z$ of the image field will be expressed as follows:

$$z = x + b_1 - a \tag{8}$$

or $$z = \frac{(1-\beta)^2}{\beta} \cdot f \tag{9}$$

One approach to maintain the same position for the original and the photosensitive member despite a change in the magnification, in the arrangement of FIG. 3, will be to permit the image $q$ of the fixed point $p$ on the object O to be always focussed at a given distance from the optical axis, in a direction perpendicular thereto. In this instance, the displacement $y$ of the lens $L_O$ in a direction perpendicular to the optical axis will be determined from the following relationship:

$$a_1 : (h + y) = b_1 : (h - y) \tag{10}$$

or $$y = \frac{1-\beta}{1+\beta} \cdot h \tag{11}$$

Thus it is seen that the displacement of the lens in a direction perpendicular to the optical axis remains the same for the variable focus lens and the customary lens. This result applies irrespective of the value of the magnification $\beta$.

Figure 4:
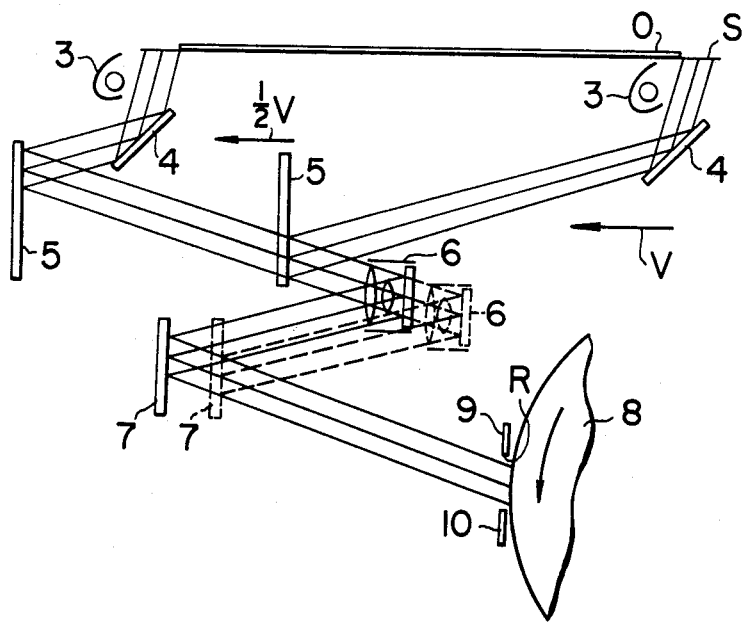
FIG. 4 is a schematic side elevation of principal parts of one embodiment of the invention.

FIG. 4 shows an optical exposure system constructed in accordance with one embodiment of the invention. Specifically, the system comprises a lamp 3 as a light source, a first reflecting mirror 4, a second reflecting mirror 5, a variable focus lens 6 of in-mirror construction and having a focal length $f_O$ at a magnification of unity, a reflecting mirror 7 having its reflecting surface oriented perpendicular to the optical axis of the lens 6, and a fixed member 9 and a movable member 10 which constitute together a variable aperture plate. An original O is placed at a given position and is slitwise irradiated by light from the lamp 3, which scans it to focus a real image of the irradiated portion thereof on an imaging position defined between the members 9, 10, to which the surface of a photosensitive member 8 is exposed as it rotates.

With a magnification of unity, the variable focus lens 6 and the reflecting mirror 7 remain stationary while the first reflecting mirror 4 is moved in the direction indicated by an arrow at a rate V, together with lamp 3, and the second reflecting mirror 5 is moved in the direction of an arrow with a rate V/2, maintaining synchronism with the movement of the first reflecting mirror 4. It should be obvious that the peripheral speed of the surface of the photosensitive member 8 is equal to V. When an end of the original O which is first to be irradiated by the light from the lamp 3 during the exposure is designated by S, this point is imaged on a point R adjacent to the fixed aperture member 9. Thus, in order to maintain the same position for placement of the original when the magnification is changed between unity and a different value, it is only necessary that the variable focus lens 6 and the reflecting mirror 7 be displaced such that an image of the point S is always focused on the point R independently from the value of the magnification. The point R where the exposure of the photosensitive member 8 is initiated will be referred to as an exposure initiation position.

When it is desired to obtain a copied image of a magnification $\beta$ relative to the original O with the optical exposure system mentioned above, the variable focus lens 6 is moved in a direction parallel to the optical axis in accordance with the equation (2). Since the variable focus lens maintains the same total length of the optical path as the magnification is changed, the displacement of the reflecting mirror 7 should be chosen so as to compensate for the displacement of the variable focus lens 6. Thus, the reflecting mirror 7 should be moved in a direction parallel to the optical axis of the lens 6 by an amount through which the lens is moved in the same direction, or an amount defined by the equation (2). Next, the variable focus lens 6 is displaced in a direction perpendicular to the optical axis thereof by an amount defined by the equation (5). As will be evident from FIG. 2, $h$ appearing in the equation (5) represents the distance of the image point S from the optical axis of the variable focus lens 6 at a magnification of unity. Subsequently, the focal length of the lens 6 is adjusted in accordance with the equation (3). In addition, the rate of movement or scanning rate of the first reflecting mirror 4 is changed to $V/\beta$ in accordance with the magnification $\beta$. Obviously, the rate of movement of the second reflecting mirror 5 is also changed to $V/2\beta$. In this manner, the image of the point S is always focussed onto the exposure initiation position.

The amount of exposure is also adjusted in accordance with the magnification $\beta$. This may be accomplished by controlling the amount of light emitted by the lamps 3 but, in the embodiment shown, the adjustment is performed in the manner described below. Maintaining a constant amount of light emitted by the lamp 3, and representing the amount of reflected light per unit area of the original O by Q, the width of the original O in a direction perpendicular to the scanning direction by $l$, and the efficiency of the optical exposure system, that is, the proportion of the amount of reflected light Q which contributes to the exposure, by $k$, it will be understood that the requirement to maintain a constant amount of light to which a unit area of the photosensitive member 8 is exposed is expressed as follows:

$$\frac{klQVt}{l\beta^1 Vt_1} = kQ \qquad (12)$$

or $$t_1 = \frac{1}{\beta^2} t \qquad (13)$$

This means that the movable aperture member 10 may be moved along the surface of the photosensitive member 8 so as to adjust the spacing between the members 9 and 10 to $1/\beta^2$ times the spacing prevailing at a magnification of unity, because the rate of movement of the photosensitive member 8 remains unchanged as the magnification is varied. However, it has been determined experimentarily that, for $0.5 \leq \beta \leq 2$, the brightness per unit area varies in proportion to $\beta$ rather than $\beta^2$, so that the spacing should be adjusted to a value which is on the order of 70 to 80 percent of the theoretical value given above. In the above described arrangement, the variable focus lens 6 may be moved in two steps, that is a movement parallel to the optical axis followed by a movement perpendicular thereto, but it may be displaced in one step.

Figure 5:
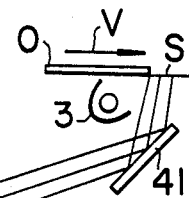
FIG. 5 is a schematic side elevation of another embodiment of the invention.
Figure 5:
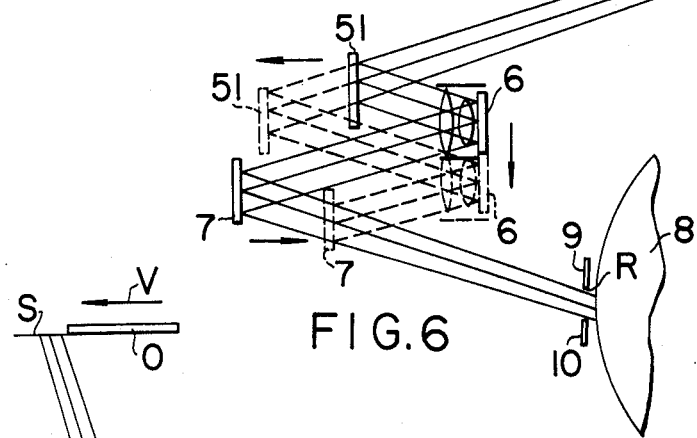

In an alternate embodiment, the lamp 3 and the first reflecting mirror 41 may be fixed in position and the original 0 is scanned during its movement, as illustrated in FIG. 5. When the magnification is changed from unity to 62, a second reflecting mirror 51 is moved in the direction of an arrow, or parallel to the optical axis of the variable focus lens 6, by an amount $(1 - \beta)f_o/(1 + \beta)$. The reflecting mirror 7 is moved by the same amount along the optical axis, but in the opposite direction from that of the second reflecting mirror 51. In addition, the reflecting mirrors 51 and 7 are moved in a direction perpendicular to the optical axis by an amount $(1 -\beta)h/2(1 + \beta)$, as shown. Also, the variable focus lens 6 is moved in a direction perpendicular to the optical axis thereof in accordance with the equation (5). The rate of movement of the original O is changed from V, at a magnification of unity, to $V/\beta$, and the amount of exposure is adjusted in a manner similar to that mentioned previously in connection with the embodiment shown in FIG. 4. By using the reflecting mirrors 51 and 7, which have an increased area of reflecting surface and are located so as not to intercept other portions of the optical path, their movement in a direction parallel to the optical axis may be sufficient. This applies equality to other embodiments of the invention.

Figure 6:
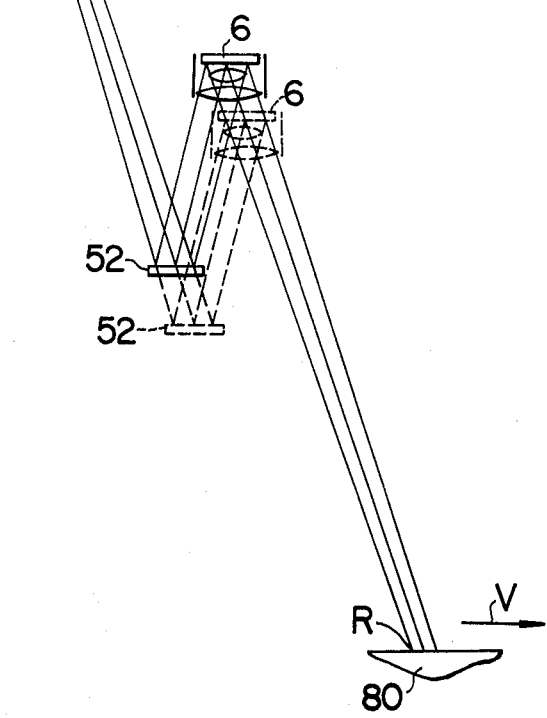
FIG. 6 is a schematic side elevation of a further embodiment of the invention.

As shown in FIG. 6, the invention can be reduced to practice by employing a combination of a single reflecting mirror 52 and the variable focus lens 6 of inmirror construction, when moving the original O. In this instance, the displacement of the reflecting mirror 52 is equal to that of the variable focus lens 6, and the components of movement of the lens 6 in directions parallel and perpendicular to the optical axis thereof are given by the equations (2) and (5), respectively. In FIG. 6, a photosensitive member is designated by numeral 80. The use of a variable focus lens which maintains a constant length of optical path facilitates the design of the arrangement and simplifies the interrelationship of the displacements of the lens and reflecting mirror or mirrors.

Figure 7:
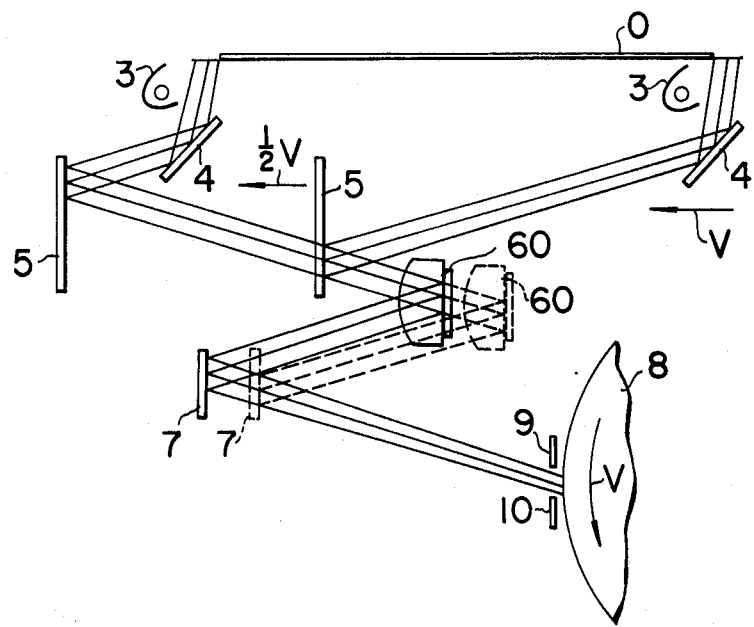
FIG. 7 is a schematic side elevation of additional embodiment of the invention.
Figure 8:
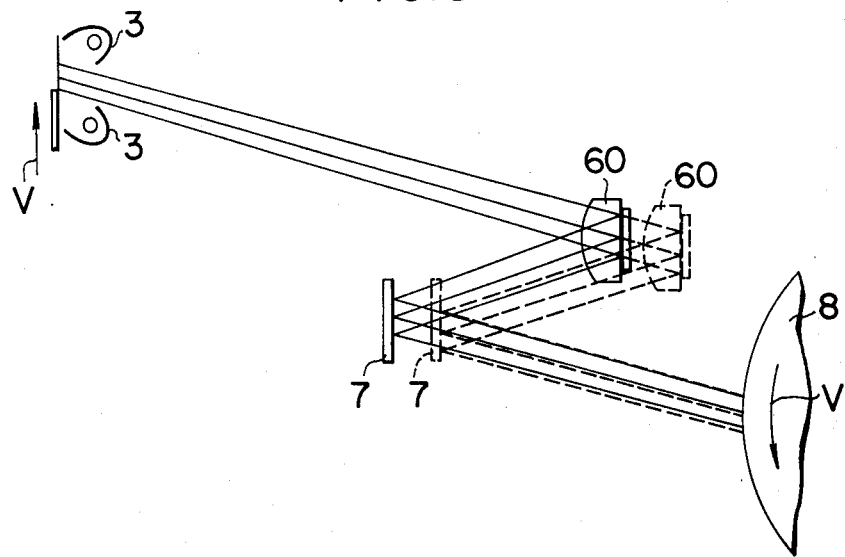
FIG. 8 is a schematic side elevation of still another embodiment of the invention.

FIGS. 7 and 8 show further embodiments of the optical exposure system which incorporate an inmirror lens 60 (hereinafter referred to simply as a lens) having a focal length $f$. In FIG. 7, the arrangement is generally similar to that shown in FIG. 4 except for the lens 60. Components of the displacement of lens 60 in directions parallel and perpendicular to the optical axis thereof, when the magnification is changed from unity to a different value, are given by the equations (7) and (11), respectively.

The displacement of the reflecting mirror 7 in a direction parallel to the optical axis is given by $(1 -\beta^2)f/2\beta$. The described displacements also apply to the lens 60 and the reflecting mirror 7 in the arrangement of FIG. 8. It should be apparent that the lens 60 may be used to construct an optical exposure system which is similar to that shown in FIGS. 5 and 6. In this instance, the displacement of the lens 60 and reflecting mirror is given by the equations (7), (9) and (11). When an in-prism or inmirror lens is used, the cost can be reduced as compared with the use of a variable focus lens.

From the foregoing, it will be understood that, in accordance with the invention, there is no need to change the position for placement of an original, nor the position or movement of a photosensitive member which is to be subjected to an exposure in an electrophotographic copying machine, when the magnification of an image being copied is changed. The use of a lens of an in-mirror or in-prism construction facilitates the adjustment of the lens position at a magnification of unity which is established as a reference, and also permits the displacement of the lens and reflecting mirror or mirrors to be simply determined as the magnification is varied. Means for moving the original, means for performing a displacement of the lens or reflecting mirror and means for switching the scanning rate may be conventional.

It should be understood that the invention is also applicable to an electrophotographic copying machine of the type which employs a lens of one of various types and a plurality of reflecting mirrors to subject a photosensitive paper to an exposure. While the displacement of the lens and reflecting mirror has been calculated on the basis of a formula which is applicable to a thin lens, some correction may be required depending on the lens which is actually employed.

What is claimed is:

1. A variable magnification slitwise exposure apparatus, for use with electrophotographic copying machines of the type in which a photosensitive surface is moved at a constant speed in a direction along a predetermined path having an exposure range therein at a fixed position while an original is scanned progressively by relative movement between the original and a source of light, said apparatus comprising: (a) holding means for supporting an original to be copied with its leading edge, considered in the scanning direction, always at a fixed position on the holding means irrespective of the magnification selected, (b) means operable to slitwise scan, at a constant rate which is adjusted dependent upon the magnification selected, an image of the original on said holding means, in order to transmit the original image onto said photosensitive surface, moving at said constant speed, at said fixed exposure range, (c) lens means having an optical axis and operable to focus the original image onto said photosensitive surface at said fixed exposure range, (d) means operable to adjust a first optical distance, between the original and said lens means, and a second optical distance, between said lens means and said photosensitive surface, in accordance with the magnification selected, (e) means operable to adjust said lens means, in accordance with the selected magnification, in a direction perpendicular to the optical axis of said lens means at a magnification of unity, by a distance y which is expressed by the following equation:

$$y = \frac{1-\beta}{1+\beta} h$$

wherein $\beta$ represents the selected magnification and h represents the height of a portion of the original image being scanned at unity magnification, and (f) means maintaining constant the quantity of light incident on a unit of area of said photosensitive surface through said lens means at any magnification for a given original image.

2. An apparatus as in claim 1 wherein said scanning means comprises means moving said holding means at said adjusted constant rate dependent on the selected magnification.

3. An apparatus as in claim 1 wherein said lens means consists of a customary lens.

4. An apparatus as in claim 3 wherein said adjusting means comprises means for setting said first and second optical distances to the values those thereof at unity magnification plus values x and z — x, respectively, as expressed by the following equations:

$$x = \frac{1-\beta}{\beta} f, \quad z = \frac{(1-\beta)^2}{\beta} f$$

wherein f represents the focal length of said customary lens used.

5. An apparatus as in claim 1 wherein said lens means consists of a variable focus lens.

6. An apparatus as in claim 5 wherein said adjusting means comprises means for setting said first optical distance to the value thereof at unity magnification plus x as expressed by the following equation:

$$x = \frac{1-\beta}{1+\beta} \times 2f_O$$

wherein $f_O$ represents a focal length of said variable focus lens at unity magnification, with the variable focus lens being adjusted with its focal length according to the formula $$\frac{4f_O\beta}{(1+\beta)^2} .$$

7. An apparatus as in claim 1 wherein said lens means comprises a lens of in-mirror construction.

8. An apparatus as in claim 1 wherein said lens means comprises a lens of in-prism construction.

9. An apparatus as in claim 1 wherein said maintaining means comprises means adjusting the intensity of light incident on said photosensitive surface through said lens means.

10. An apparatus as in claim 1 wherein said maintaining means comprises aperture plate means having a slit-like aperture variable in its width.

11. An apparatus as in claim 1, wherein said scanning means comprises means maintaining said holding means stationary, and means having a first and a second reflecting mirror for directing the original image to said lens means, said second mirror being moved at half the rate of said first mirror which latter is moved at said constant rate adjusted dependent on the selected magnification.

12. A variable magnification slitwise exposure process for use with electrophotographic copying machines of the type in which a photosensitive surface is moved at a constant speed in a direction along a predetermined path having an exposure range therein at a fixed position while an original is scanned progressively by relative movement between the original and a source of light, comprising the steps of: (a) holding an original to be copied in a given plane with its leading edge, considered in the scanning direction, always at the same starting position irrespective of the magnification selected, (b) slitwise scanning, at a constant rate which is adjusted dependent upon the magnification selected, an image of said original in said plane in order to transmit the original image onto said photosensitive surface, moving at said constant speed, at said fixed exposure range, (c) focussing the original image onto said photosensitive surface at said fixed exposure range through lens means having an optical axis, (d) adjusting a first optical distance between said original and said lens means and a second optical distance between said lens means and said photosensitive surface in accordance with the magnification selected, (e) adjusting said lens means in accordance with the selected magnification, in a direction perpendicular to the optical axis of said lens means at a magnification of unity, by a distance y which is expressed by the following equation:

$$y = \frac{1-\beta}{1+\beta}$$

wherein $\beta$ represents the selected magnification and h represents a height of a portion of the original image being slitwise scanned at the unity magnification, and (f) maintaining constant the quantity of light incident on a unit of area of said photosensitive surface through said lens means at any magnification for a given original image.

13. The process as in claim 12 wherein said scanning step comprises moving said original at said constant rate adjusted dependent on the selected magnification in said plane.

14. The process as in claim 12 wherein said scanning step comprises maintaining said original stationary and transmitting the original image to said lens means while maintaining the first optical distance constant during the scanning of said original.

15. The process as in claim 12, wherein said lens means consists of a customary lens and said adjusting step comprises setting said first and second optical distances to the values thereof at unity magnification plus values $x$ and $z - x$, respectively, as expressed by the following equations:

$$x = \frac{1-\beta}{\beta} f, \quad z = \frac{(1-\beta)^2}{\beta} f$$

wherein $f$ represents the focal length of said customary lens used.

16. The process as in claim 12 wherein said lens means consists of a variable focus lens and said varying step comprises setting said first optical distance to the value thereof at unity magnification plus x as expressed by the following equation:

$$x \frac{1-\beta}{1+\beta} \times 2 + f_O$$

wherein $f_O$ represents a focal length of said variable focus lens at the unity magnification, with the variable focus lens being adjusted with its focal length according to the formula $$\frac{4f_O\beta}{(1+\beta)^2}.$$

* * * * *